United States Patent [19]
Stanley et al.

[11] 3,869,385
[45] Mar. 4, 1975

[54] PROCESS FOR CONTAINING OIL SPILLS

[75] Inventors: William L. Stanley, Richmond; Allen G. Pittman, El Cerrito, both of Calif.

[73] Assignee: The Unites States of America as represented by the Secretary of Agriculture, Washington, D.C.

[22] Filed: Oct. 18, 1971

[21] Appl. No.: 190,320

[52] U.S. Cl. ............... 210/53, 210/54, 210/DIG. 21
[51] Int. Cl. .................................................. C02b 9/02
[58] Field of Search .......... 210/40, 42, 59, DIG. 21, 210/43, 47, 52, 53

[56] References Cited
UNITED STATES PATENTS

| | | | |
|---|---|---|---|
| 3,415,745 | 12/1968 | Isaacson et al. | 210/54 |
| 3,462,295 | 8/1969 | Elmquist et al. | 117/143 R |
| 3,497,450 | 2/1970 | Roth | 210/40 X |
| 3,536,616 | 10/1970 | Kordoh et al. | 210/40 |
| 3,591,524 | 7/1971 | Eriksen | 210/40 X |
| 3,657,125 | 4/1972 | Strickman | 210/40 |
| 3,755,189 | 8/1973 | Gilchrist | 210/42 X |
| 3,810,835 | 5/1974 | Ferm | 210/59 |

FOREIGN PATENTS OR APPLICATIONS

| | | | |
|---|---|---|---|
| 979,978 | 1/1965 | Great Britain | 210/DIG. 21 |

OTHER PUBLICATIONS

"Firms Seek Ways to Control, Disperse Oil Slicks," Chemical & Engineering News, July 1, 1968, pp. 46–47.

*Primary Examiner*—Thomas G. Wyse
*Attorney, Agent, or Firm*—M. Howard Silverstein; W. Takacs

[57] ABSTRACT

Oil spills on bodies of water are contained by applying a polyisocyanate and a polyamine thereto.

8 Claims, No Drawings

PROCESS FOR CONTAINING OIL SPILLS

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

The invention relates to and has among its objects the provision of novel processes for containing oil spills on bodies of water. Further objects of the invention will be evident from the following description wherein parts and percentages are by weight unless otherwise specified.

Oil spilled from tankers transporting the same or leaked from offshore wells is becoming an increasing threat to the environment. It was reported recently that the mid-Atlantic Ocean has become fouled with "asphalt-like lumps" and other gunk presumably from oil. Spills and leaks are creating havoc with the wildlife that inhabit oceans, bays, and the surrounding areas. Numerous birds have died because their bodies have been drenched with thick crude oil. Fish, seals, and the like have also felt the effects of man's upset of their environment. As the demand for petroleum products rises, the chances of a spill or leak are considerably enhanced.

The present invention provides a means for obviating the problems outlined above. More particularly, the invention enables oil spills to be contained, that is, kept within a limited area so that the oil can be collected efficiently and economically. On the other hand, where the spill is not contained, the oil is dispersed by wind or wave action over a wide area, with the result that its collection is rendered difficult and even impossible in extreme cases. The process of the invention is applicable for the containment of oil spills on bodies of water of all kinds, including those containing fresh, brackish, or salt (sea) water, and the oil may be any liquid petroleum material, including crude oil, residual fuel oils, and distilled products such as fuel oils, kerosene, diesel oils, etc. The expression "oil spill" is employed herein to designate a pool or mass of oil floating on a body of water, and without distinction as to the source of the oil or the manner by which it was released.

Basically, the process of the invention involves applying a polyisocyanate and a polyamine to the oil spill. The said reagents react, yielding a polymer which entraps the oil, forming a rubbery gelled mass, and thereby preventing dispersion of the oil. The reagents may be applied to the entire area of the oil spill or, more preferably, to selected parts thereof—for example, to the outer periphery thereof.

In a typical practice of the invention, the reagents are applied to the outer periphery of the body of oil which constitutes the spill. The application can be accomplished by means of a boat or other vessel which circles the oil spill and concomitantly deposits the reagents on the edge of the oil. Alternatively, the reagents can be applied to the perimeter of the oil spill by low-flying aircraft. To facilitate their application, the reagents may be employed in the form of solutions in kerosene or other inert solvent. Soon after the reagents are applied, a rubber-like gel is formed and this barrier or dam prevents dispersion of the oil. Conventional means such as pumps or skimmers can then be used to harvest the oil which is contained by the so-formed barrier or dam.

In cases where there is severe wind or wave action, the formation of a peripheral dam may not be sufficient to contain the spill. In such case, the reagents may be additionally applied over interior surface portions of the spill. The resulting increase in viscosity of the entire body of oil will then tend to resist the wave/wind action and hold the body together as a coherent entity.

In situations where the oil is emerging from some source which can be reached—such as a break in the sides of a tanker—the reagents can be applied to the liquid as it leaves the source. The resulting increase in viscosity due to formation of the polymer will cause the resulting spill to take the form of a coherent coagulated mass which can be collected readily by conventional equipment such as skimmers or the like.

In a practice of the invention, the polyisocyanate and polyamine reagents may be applied simultaneously. Alternatively, they may be applied successively. In the latter case it is preferred that the polyisocyanate be applied first. With any mode of application, the two reagents are preferably used in such proportion as to furnish free isocyanate groups in approximately equimolar proportion to amino groups. This proportion, however, need not be vigorously applied as the polymer will be formed properly with an excess of either of the reactive moieties. It is obvious, nonetheless, that where equimolar proportions of free isocyanate and amino groups are used, the reagents will be most efficiently utilized.

In cases where the spill is contained by forming a polymer dam about its perimeter, the oil within the so-formed dam can be removed by conventional mechanical means and re-used directly or after treatment to separate any occluded water. In cases where the polyisocyanate and polyamine are applied to considerable surface areas of the spill or actually mixed with an outflow of oil, the recovered mass of oil will require more extensive purification. For example, distillation can be employed to segregate the volatile oil fraction from the essentially non-volatile polymeric material.

An advantage of the invention is that it does not depend on the absorption of oil as do materials presently used in the art, e.g., straw, cotton, and other fibrous materials. Generally, these materials must be used in large excess because the amount of oil absorbed by these is relatively small. The process of the invention is not based on absorbance but on the principle of containing the oil by a thickening or coagulating effect, with the result that relatively small proportions of the reagents are effective. For example, in many cases the use of about 1 to 3 parts of polyisocyanate plus polyamine per 100 parts of oil is sufficient to attain the desired containment effect.

The Reagents (General)

The polyisocyanate and polyamine reagents used in accordance with the invention are selected to meet these requirements:

1. They should have a density less than that of the body of water on which the spill exists.
2. They should be at least partially miscible with oil and essentially immiscible with water.

With regard to Item 1, it is important that the reagents float on the water rather than sink or cause the oil to sink. The requirement is easy to fulfill as most organic compounds unless they contain heavy atoms such as bromine, iodine, etc. have a density less than that of fresh or salt water.

The second criterion is also easily fulfilled. One can readily select those compounds which contain enough carbon chains, rings, or other oleophilic constituents to provide the desired oil-miscibility combined with water-immiscibility. In any particular case, the suitability of a candidate compound can be determined by simple solubility tests or by reference to the usual chemical handbooks.

An additional item is that best results are obtained when both the polyisocyanate and polyamine do not exert a dispersing effect on oil films. In the case of the polyisocyanates this condition is readily met because these compounds in general do not exert any oil dispersion effect. In the case of the polyamines a greater degree of selection is required because many polyamines—particularly those which contain primary amine groups—will disperse oil films. A candidate compound can be tested for this property as follows:

A small pan is partly filled with 5% salt water. Then, crude oil is placed on top of the water where it remains as a coherent film. A few drops of the candidate compound are placed on the oil film and the system observed. If the addition of the compound causes the film to be dispersed, that is, to move away from the locus of the applied droplet, this compound is not a preferred one. If, on the other hand, the oil film remains in place as a coherent film, the compound is one which does not cause oil dispersion and is a preferred reagent for use in accordance with the invention.

In general, we have observed that the desired property (no dispersion effect on oil films) is displayed by those polyamines wherein the hydrophilic properties imparted by the amine groups are balanced by alkyl groups which contain 4 or more carbon atoms or by other organic groups which impart oleophilic properties. Typical preferred polyamines are those wherein each amine group is secondary, for example, containing an N-alkyl substituent having at least 4 carbon atoms.

The Polyisocyanates

Representative examples of polyisocyanates which may be used in accordance with the invention are listed below by way of illustration and not limitation:

toluene-2,4-diisocyanate
toluene-2,6-diisocyanate
commercial mixtures of toluene-2,4-and 2,6-diisocyanates
ethylene diisocyanate
ethylidene diisocyanate
propylene-1,2-diisocyanate
cyclohexylene-2,2-diisocyanate
cyclohexylene-1,4-diisocyanate
m-phenylene diisocyanate
3,3'-diphenyl-4,4'-biphenylene diisocyanate
4,4'-biphenylene diisocyanate
1,6-hexamethylene diisocyanate
1,4-tetramethylene diisocyanate
1,10-decamethylene diisocyanate
1,5-naphthalene diisocyanate
cumene-2,4-diisocyanate
4-methoxy-1,3-phenylene diisocyanate
4-ethoxy-1,3-phenylene diisocyanate
2,4'-diisocyanatodiphenylether
5,6-dimethyl-1,3-phenylene diisocyanate
2,4-dimethyl-1,3-phenylene diisocyanate
4,4'-diisocyanatodiphenylether
benzidinediisocyanate
4,6-dimethyl-1,3-phenylene diisocyanate
9,10-anthracene diisocyanate
4,4'-diisocyanatodibenzyl
3,3-dimethyl-4,4'-diisocyanatodiphenylmethane
2,6-dimethyl-4,4'-diisocyanatodiphenyl
2,4-diisocyanatostilbene
3,3'-dimethyl-4,4'-diisocyanatodiphenyl
3,3'-dimethoxy-4,4'-diisocyanatodiphenyl
1,4-anthracene diisocyanate
2,5-fluorene diisocyanate
1,8-naphthalene diisocyanate
2,6-diisocyanatobenzfuran
2,4,6-toluene triisocyanate, and
p,p',p'-triphenylmethane triisocyanate Especially suitable for use in accordance with the invention are the compounds produced by the polymerization of fat acids, followed by conversion to diisocyanates. Such compounds are disclosed in U.S. Pat. No. 3,462,295, and may be represented by the formula $$R + (CH_2)_y - NCO\ ]_x$$

wherein $y$ is an integer selected from 0 to 1, $x$ is an integer of 2 to about 4, and R is the hydrocarbon group of polymeric fat acids $R(COOH)_x$, said polymeric fat acids having been prepared by polymerizing fat acids of 8-24 carbon atoms.

Coming into special consideration is the compound of the aforesaid class which is commercially available from General Mills, Inc. under the name of "DDI" diisocyanate, and which is derived from dimer acid produced by the polymerization of $C_{18}$ fat acids. The compound has the structure $$R\ (CH_2 - NCO)_2$$

where R is the hydrocarbon group of a polymeric fat acid $R(COOH)_2$ prepared by dimerizing fat acids containing 18 carbon atoms. Some of the properties of DDI diisocyanate are: a low viscosity liquid, specific gravity 0.924, NCO content 14%, soluble in benzene, hexane, and other common organic solvents. The compound is reported to have lower animal toxicity than various other diisocyanates such as hexamethylene diisocyanate and 2,4-toluene diisocyanate.

Also useful in a practice of the invention are polyurethanes which contain free isocyanate groups. These compounds may be prepared, as well known in the art, by reacting a polyol with a polyisocyanate, using an excess of the latter to ensure provision of free isocyanate groups in the product. A typical, but by no means limiting, example is illustrated below:

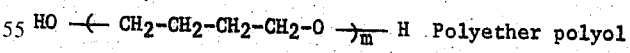 Polyether polyol

+

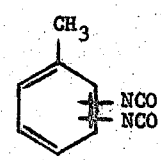 Polyisocyanate

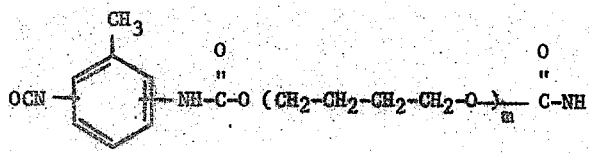
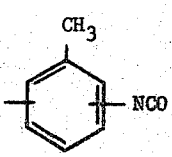

Isocyanate-terminated polyether polyurethane (In the above formulas, *m* represents the number of tetramethyleneether repeating units. This may range, for example, about from 5 to 50.)

In preparing the polyurethanes, one may use any of the polyisocyanates hereinabove listed. As the co-reactant, one may use any of a wide variety of compounds which contain two or more hydroxy groups, e.g., polyhydric alcohols or phenols, polyether polyols, and polyester polyols.

Illustrative examples of polyhydric alcohols and phenols which may be employed are listed below:

ethylene glycol
glycerol
pentaerythritol
dipentaerythritol
propylene glycol
trimethylene glycol
1,2-butylene glycol
1,3-butanediol
1,4-butanediol
1,5-pentanediol
1,2-hexylene glycol
1,10-decanediol
1,2-cyclohexanediol
2-butene-1,4-diol
3-cyclohexene-1,1-dimethanol
4-methyl-3-cyclohexene-1,1-dimethanol
3-methylene-1,5-pentanediol
diethylene glycol
(2-hydroxyethoxy)-1-propanol
4-(2-hydroxyethoxy)-1-butanol
5-(2-hydroxypropoxy)-1-pentanol
1-(2-hydroxymethoxy)-2-hexanol
1-(2-hydroxypropoxy)-2-oxtanol
3-allyloxy-1,5-pentanediol
2-allyloxymethyl-2-methyl-1,3-propanediol
[(4-pentyloxy)methyl]-1,3-propanediol
3-(o-propenylphenoxy)-1,2-propanediol
thiodiglycol
2,2'-[thiobis(ethyleneoxy)]diethanol
polyethyleneether glycol (molecular weight about 200)
2,2'-isopropylidenebis(p-phenyleneoxy)diethanol
1,2,6-hexanetriol
1,1,1-trimethylolpropane
3-(2-hydroxyethoxy)-1,2-propanediol
3-(2-hydroxypropoxy)-1,2-propanediol
2,4-dimethyl-2-(2-hydroxyethoxy)methylpentanediol-1,5
1,1,1-tris[(2-hydroxyethoxy)methyl]ethane
1,1,1-tris[(2-hydroxypropoxy)methyl]propane
triethanolamine
triisopropanolamine
resorcinol
pyrogallol
phloroglucinol
hydroquinone
4,6-di-teriarybutyl catechol
catechol
orcinol
methylphoroglucinol
hexylresorcinol
3-hydroxy-2-naphthol
2-hydroxy-1-naphthol
2,5-dihydroxy-1-naphthol
bis-phenols such as 2,2-bis-(p-hydroxyphenyl) propane and bis-(p-hydroxyphenyl)-methane
1,12-tris-(hydroxyphenyl)-ethane
1,1,3-tris-(hydroxyphenyl)-propane Hereinabove it has been noted that the polyurethanes may be derived from polyether polyols. Among the polyether polyols which may be so used are those prepared by reaction of an alkylene oxide with an initiator containing active hydrogen groups, a typical example of the initiator being a polyhydric alcohol such as ethylene glycol. The reaction is usually carried out in the presence of either an acidic or basic catalyst. Examples of alkylene oxides which may be employed in the synthesis include ethylene oxide, propylene oxide, any of the isomeric butylene oxides, and mixtures of two or more different alkylene oxides such as mixtures of ethylene and propylene oxides. The resulting polymers contain a polyether backbone and are terminated by hydroxyl groups. The number of hydroxyl groups per polymer molecule is determined by the functionality of the active hydrogen initiator. For example, a difunctional alcohol such as ethylene glycol (as the active hydrogen initiator) leads to polyether chains in which there are two hydroxyl groups per polymer molecule. When polymerization of the oxide is carried out in the presence of glycerol, a trifunctional alcohol, the resulting polyether molecules contain an average of three hydroxyl groups per molecule. Even higher functionality—more hydroxyl groups—is obtained when the oxide is polymerized in the presence of such polyols as pentaerythritol, dipentaerythritol, and the like. In similar manner, any of the above-listed polyhydric alcohols and phenols may be reacted with alkylene oxides to produce useful polyether polyols.

The polyester polyols which may be employed as precursors for the polyurethanes are most readily prepared by condensation polymerization of a polybasic acid with a polyhydric alcohol or phenols. These reactants are used in such proportion that essentially all the acid groups are esterified and the resulting chain of ester units is terminated by hydroxyl groups. Representative examples of polybasic acids are oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethylglutaric acid, α,β-diethylsuccinic acid, o-phthalic acid, isophthalic acid, terephthalic acid, hemimellitic acid, trimellitic acid, trimesic acid, mellophanic acid, prehnitic acid, pyromellitic acid, citric acid, benzenepentacarboxylic acid, 1,4-cyclohexanedicarboxylic acid, diglycollic acid, thiodiglycollic acid, dimerized oleic acid, dimerized linoleic acid, and the like. Representative examples of polyhydroxy compounds for reaction with the polybasic acids includes ethylene glycol, 1,3-propylene glycol, 1,2-propylene glycol, 1,4-butylene glycol, 1,3-butylene glycol, 1,2-butylene glycol, butene-1,4-diol, 1,5-pentane diol, 1,4-pentane diol, 1,3-pentane diol, 1,6-hexane diol, hexene-1,6-diol, 1,7-heptane diol, diethylene glycol, glycerine, trimethylol propane, 1,3,6-hexanetriol, triethanolamine, pentaerythritol, and any of the other polyhydric alcohols or phenols listed hereinabove in connection with the preparation of polyether polyols.

Esters of the hydroxyl-containing acid, ricinoleic acid, form another category of useful polyester polyols. Typically, one can use esters of ricinoleic acid with ethylene glycol, propylene glycol, glycerol, pentaerythritol, diglycerol, dipentaerythritol, polyalkyleneether glycols, and the like. Representative of this category of polyester polyols is castor oil which is composed mainly of the tri-glyceride of ricinoleic acid.

The Polyamines

With regard to the polyamine reagent required for a practice of the invention, one can use any of the aromatic, aliphatic, or heterocyclic compounds which contain two or more primary or secondary amine groups, and which satisfy the aforesaid criteria. Representative examples of polyamines which can be used are listed below by way of illustration:

1,4-diaminocyclohexane
N,N'-dimethyl-1,6-hexanediamine
N,N'-dibutyl-1,6-hexanediamine
1,4-bis-(methylamino)-cyclohexane
ortho-, meta-, or para-phenylenediamine
benzidine
xylylene diamine
m-toluylene diamine
o-tolidine Also useful are the compounds produced by the polymerization of fat acids, followed by conversion to polyamines. Such compounds are disclosed in U.S. Pat. No. 3,462,295, and may be represented by the formula $$R[(CH_2)_y-NH_2]_x$$

wherein $y$ is an integer selected from 0 and 1, $x$ is an integer of 2 to about 4, and R is the hydrocarbon group of polymeric fat acids $R(COOH)_x$, said polymeric fat acids having been prepared by polymerizing fat acids of 8–24 carbon atoms.

We have found that certain polyamines are free from oil-dispersing characteristics and thus particularly useful in the process of the invention. These polyamines are copolymers prepared by copolymerizing the following monomers:

A. an alkyl ester of the structure

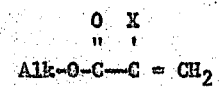

wherein Alk represents an alkyl group containing 8 to 20 carbon atoms and X represents H or $CH_3$, and B. An aminoalkyl ester of the structure

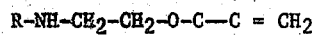

wherein R represents an alkyl group containing 1 to 20 carbon atoms and X represents H or $CH_3$.

In a typical example, lauryl methacrylate (about 1 to 5 moles) is copolymerized with t-butylaminoethyl methacrylate (1 mole) by applying conventional polymerization techniques—heating to about 80°–100° C. in the presence of an initiator such as $\alpha,\alpha'$-azobisisobutyronitrile.

EXAMPLES

The invention is further demonstrated by the following illustrative examples.

The polyisocyanate used in Examples 2 and 3 was DDI diisocyanate, a product derived from dimer acid produced by dimerization of $C_{18}$ fat acids, and described hereinabove.

The polyamine used in Examples 2 and 3 was prepared as described in Example 1.

EXAMPLE 1

Lauryl methacrylate (10 parts) was mixed with t-butyl-2-aminoethyl methacrylate (2 parts) and $\alpha,\alpha'$-azobisisobutyronitrile (0.1 part). The mixture was heated at about 90° C. on a steam bath for 2 hours. The solid copolymer so formed was dissolved in an equal amount of kerosene and the resulting solution employed in the following examples.

EXAMPLE 2

A small enamel pan (approximately 7 inches × 12 inches) was filled to a depth of about 2 inches with 5% brine. Approximately 10 g. of Alaska crude oil was poured on the surface of the water. The outer edge of the resulting oil slick was treated with about 0.3 g. of DDI (applied dropwise), followed immediately by 0.6 g. of the kerosene solution of the polyamine (also applied dropwise). The polymer gel formed rapidly, thus containing the oil within a rubber-like ring.

EXAMPLE 3

An oil spill was prepared as described in Example 1. About 0.3 g. of DDI was added to the center of the oil. After approximately 1 minute, 0.6 g. of the polyamine solution was added in the same place. In a matter of minutes the entire oil spill was converted to a gel-like coherent mass which was easily removed from the surface of the water.

Having thus described our invention, we claim:

1. A process for containing an oil spill on a body of water, which comprises
   applying to the oil spill a polyisocyanate and a polyamine, in such amounts as to furnish free isocyanate groups in approximately equimolar proportion to amino groups, and
   wherein both the polyisocyanate and the polyamine have a density less than that of the water in said body and are at least partially miscible with oil but essentially immiscible with water.

2. The process of claim 1 wherein polyisocyanate and polyamine are applied simultaneously.

3. The process of claim 1 wherein the polyisocyanate and polyamine are applied successively.

4. The process of claim 1 wherein the polyisocyanate and polyamine are applied to the peripheral portion of the oil spill.

5. The process of claim 1 wherein both the polyisocyanate and the polyamine do not exhibit a dispersion effect on oil films.

6. The process of claim 1 wherein the polyisocyanate has the structure $$R+(CH_2)_y-NCO]_x$$

wherein $y$ is an integer selected from 0 to 1, $x$ is an integer of 2 to about 4, and R is the hydrocarbon group of polymeric fat acids $R(COOH)_x$, said polymeric fat acids having been prepared by polymerizing fat acids of 8–24 carbon atoms.

7. The process of claim 1 wherein the polyamine is a copolymer of a. an alkyl ester of the structure $$\text{alk}-O-C(=O)-C(X)=CH_2$$

wherein alk represents an alkyl group containing 8 to 20 carbon atoms and X represents H or $CH_3$, and b. an aminoalkyl ester of the structure $$R-NH-CH_2-CH_2-O-C(=O)-C(X)=CH_2$$

wherein R represents an alkyl group containing 1 to 20 carbon atoms, and X represents H or $CH_3$.

8. A process for limiting the dispersion of an oil spill on a body of water, which comprises entrapping selected portions of the oil in a polymer matrix, the polymer being formed in situ by reaction of a polyisocyanate and a polyamine, applied to the oil in such amounts as to furnish free isocyanate groups in approximately equimolar proportion to amino groups, and wherein both of said reactants have a density less than that of the water in said body, are at least partially miscible in oil but immiscible in water, and do not exhibit a dispersion effect on oil films.

* * * * *